(12) United States Patent
Minkin et al.

(10) Patent No.: US 9,286,256 B2
(45) Date of Patent: Mar. 15, 2016

(54) SHARING DATA CROSSBAR FOR READS AND WRITES IN A DATA CACHE

(75) Inventors: Alexander L. Minkin, Los Altos, CA (US); Steven J. Heinrich, Madison, AL (US); Rajeshwaran Selvanesan, Milpitas, CA (US); Stewart Glenn Carlton, Madison, AL (US); John R. Nickolls, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 647 days.

(21) Appl. No.: 12/892,862

(22) Filed: Sep. 28, 2010

(65) Prior Publication Data

US 2011/0082961 A1    Apr. 7, 2011

Related U.S. Application Data

(60) Provisional application No. 61/246,368, filed on Sep. 28, 2009.

(51) Int. Cl.
| G06F 12/00 | (2006.01) |
| G06F 13/40 | (2006.01) |
| G06F 13/00 | (2006.01) |
| G06F 13/28 | (2006.01) |

(52) U.S. Cl.
CPC ........ G06F 13/4022 (2013.01); G06F 13/4031 (2013.01)

(58) Field of Classification Search
CPC .......................... G06F 13/4022; G06F 13/4031

USPC ..................... 710/317; 711/150, 167
See application file for complete search history.

(56) References Cited

U.S. PATENT DOCUMENTS

| 5,081,575 | A  | * | 1/1992  | Hiller et al. .................. 710/317 |
| 5,822,606 | A  | * | 10/1998 | Morton ........................... 712/16 |
| 6,651,148 | B2 | * | 11/2003 | Widdup ......................... 711/158 |
| 6,836,815 | B1 | * | 12/2004 | Purcell ............... G06F 13/1657 710/317 |
| 7,383,415 | B2 | * | 6/2008  | Jordan et al. .................. 711/207 |
| 7,457,936 | B2 | * | 11/2008 | Huang et al. .................. 711/217 |
| 8,086,806 | B2 | * | 12/2011 | Nyland et al. ................. 711/154 |
| 2002/0026493 | A1 | * | 2/2002 | Scardamalia et al. ........ 709/213 |
| 2004/0103245 | A1 | * | 5/2004 | Fukusawa et al. ............ 711/113 |
| 2006/0136605 | A1 | * | 6/2006 | Olukotun ............ G06F 12/0811 710/1 |
| 2011/0023039 | A1 | * | 1/2011 | Memik et al. ................. 718/102 |

* cited by examiner

*Primary Examiner* — Mark Giardino, Jr.
(74) *Attorney, Agent, or Firm* — Artegis Law Group, LLP

(57) ABSTRACT

The invention sets forth an L1 cache architecture that includes a crossbar unit configured to transmit data associated with both read data requests and write data requests. Data associated with read data requests is retrieved from a cache memory and transmitted to the client subsystems. Similarly, data associated with write data requests is transmitted from the client subsystems to the cache memory. To allow for the transmission of both read and write data on the crossbar unit, an arbiter is configured to schedule the crossbar unit transmissions as well and arbitrate between data requests received from the client subsystems.

28 Claims, 8 Drawing Sheets

SHARING DATA CROSSBAR FOR READS AND WRITES IN A DATA CACHE

CROSS-REFERENCE TO RELATED APPLICATIONS

This application claims benefit of U.S. provisional patent application entitled "Sharing Data Cross Bar for Reads and Writes in the Data Cache," filed on Sep. 28, 2009 and having a Ser. No. 61/246,368.

BACKGROUND OF THE INVENTION

1. Field of the Invention

The present invention relates generally to the field of parallel graphics processing and, more specifically, to sharing a data crossbar for reads and writes in the data cache.

2. Description of the Related Art

A computing architecture may be designed such that multiple parallel threads within a thread group can all access memory locations within an L1 cache. An L1 cache memory is often laid out as a series of banks including memory locations that can be uniquely identified. Each thread in the thread group can read data from or write data to any memory location within a bank of the L1 cache memory.

To transmit data to/from the L1 cache memory, an L1 cache often implements data crossbars. The data crossbars are configured to transmit data retrieved from the L1 cache memory to clients (reads) and from the clients to the L1 cache memory (writes). In a typical architecture, a data crossbar is dedicated for transmitting read data and another data crossbar is dedicated for transmitting write data. In such an architecture, a significant amount of on-chip die space is consumed for data crossbars. Such a design is both architecturally undesirable and expensive to produce.

Accordingly, what is needed in the art is an L1 cache crossbar design that transmits data to/from the L1 cache memory more efficiently.

SUMMARY OF THE INVENTION

One embodiment of the present invention sets forth a method for processing a plurality data requests received from a client entity within a computing device. The method includes the steps of determining an instruction type and an address associated with each data request included in the plurality of data requests, identifying, based on the instruction types and the addresses associated with the plurality of data requests, a subset of data requests to process together, processing the subset of data requests at a first clock cycle, and scheduling a crossbar unit either to transmit data associated with at least one data request included in the subset of data requests to a memory unit at a second clock cycle or to transmit data associated with the at least one data request retrieved from the memory at the second clock cycle.

One advantage of the disclosed technique is that read and write data is transmitted on the same crossbar unit, thus, significantly reducing the amount of on-chip die space needed for a crossbar.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
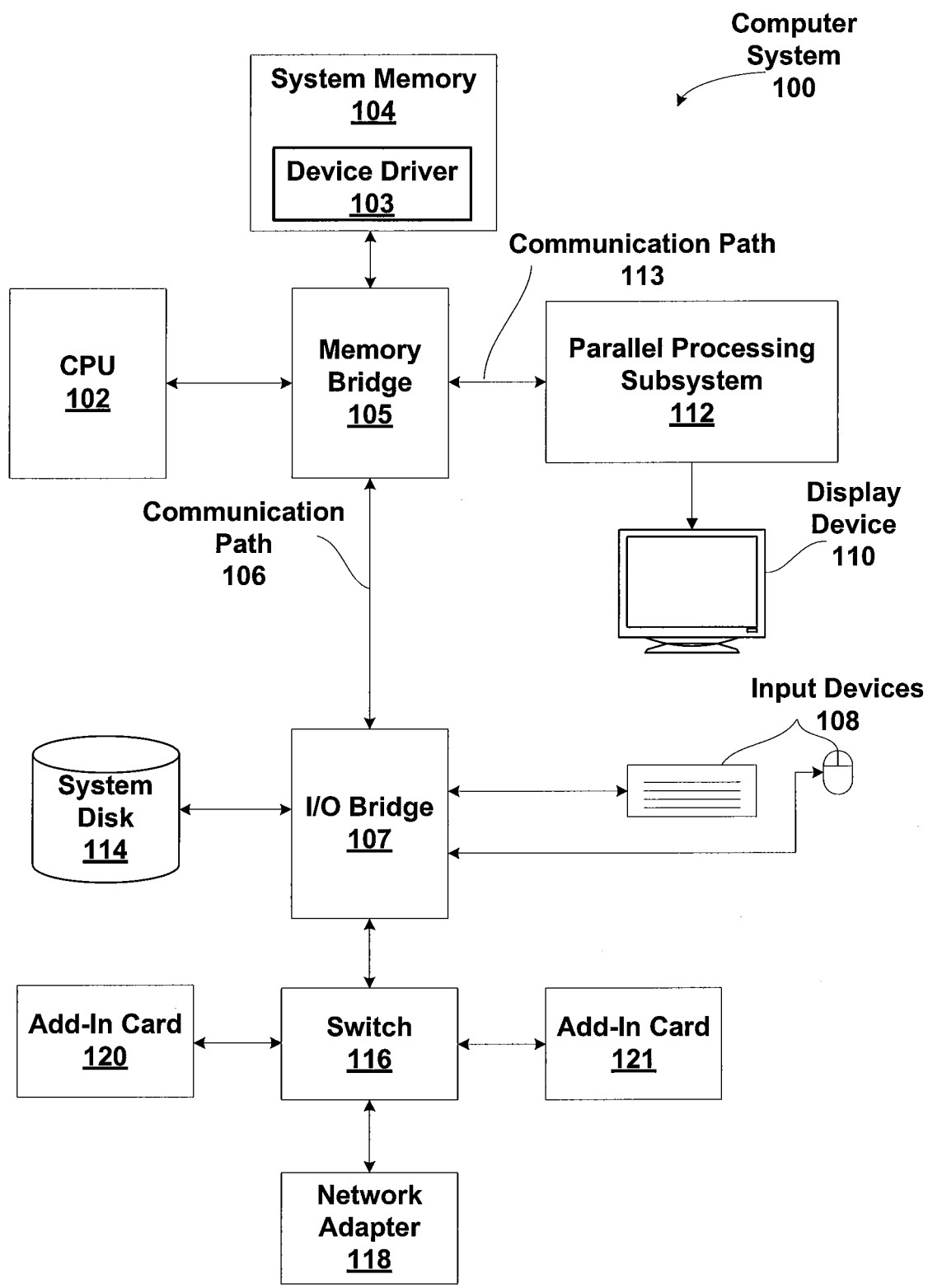
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
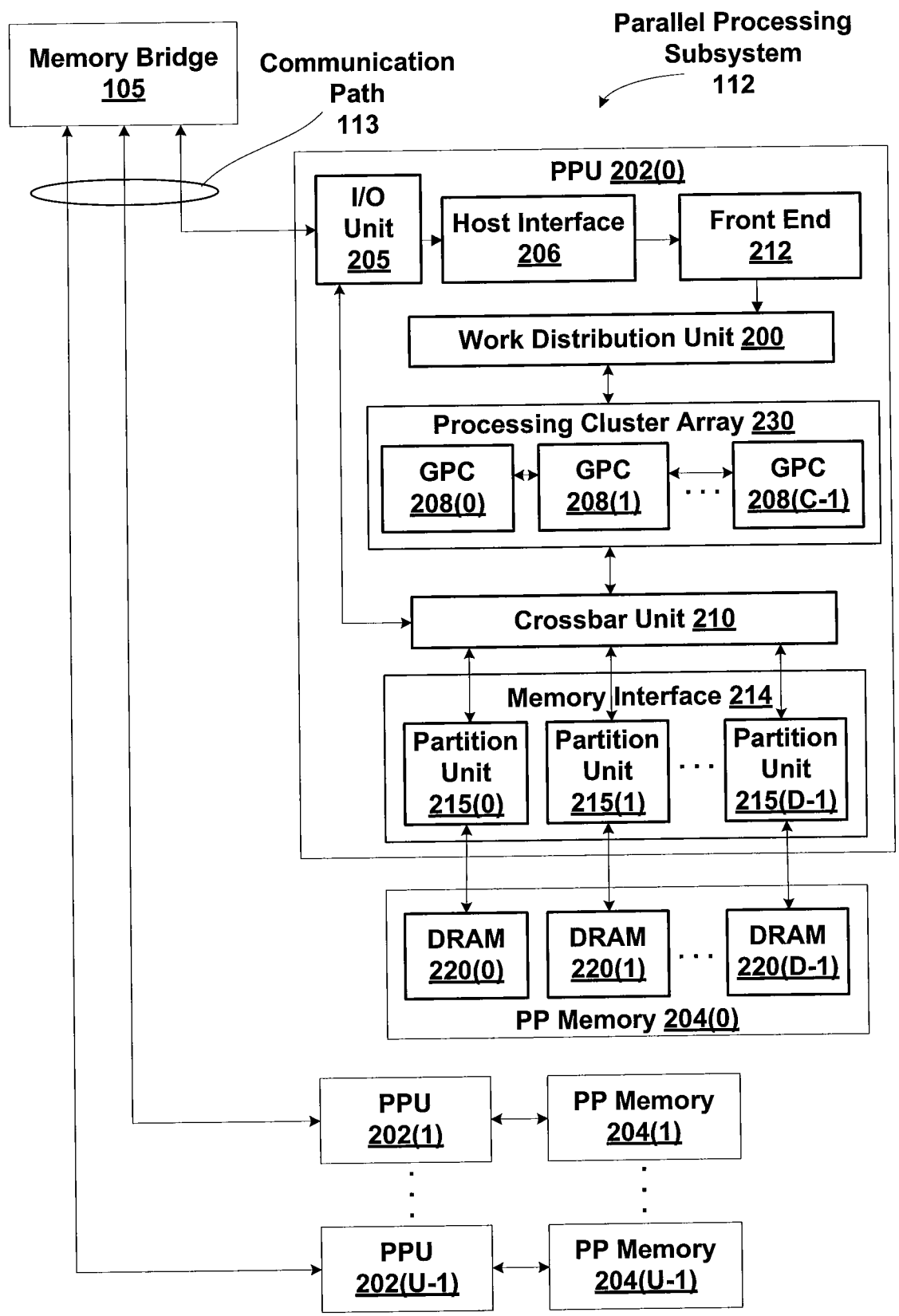
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
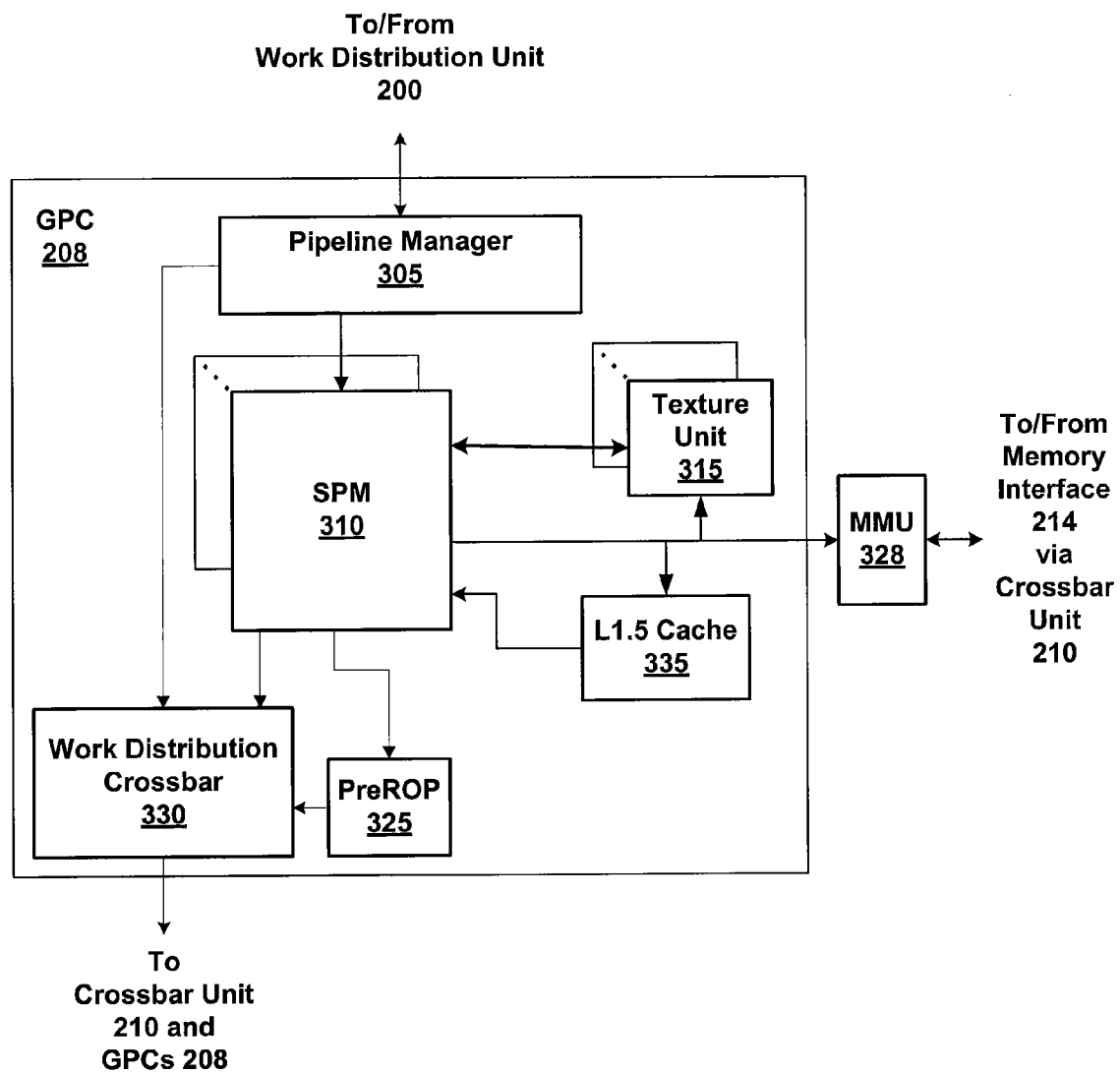
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
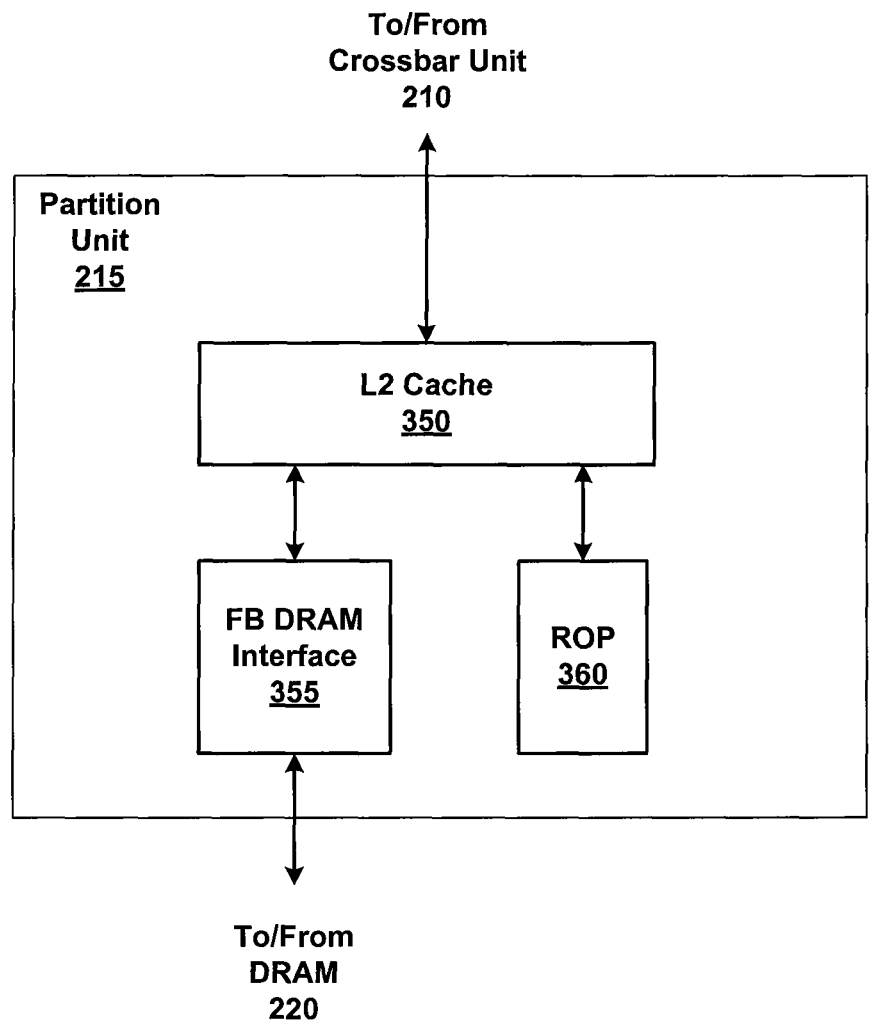
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
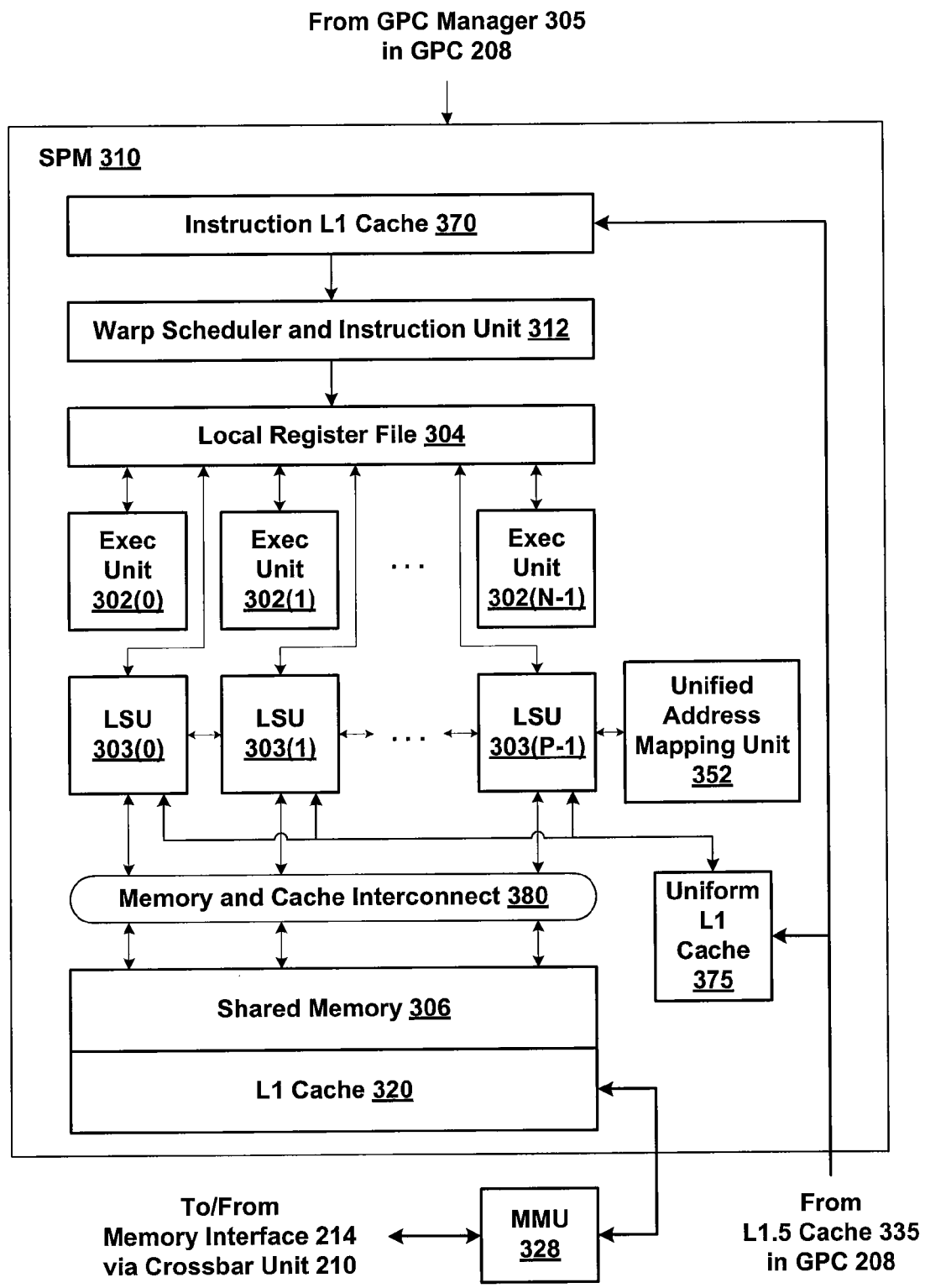
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on—chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers.

Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Sharing Data Crossbar for Reads and Writes

Figure 4:
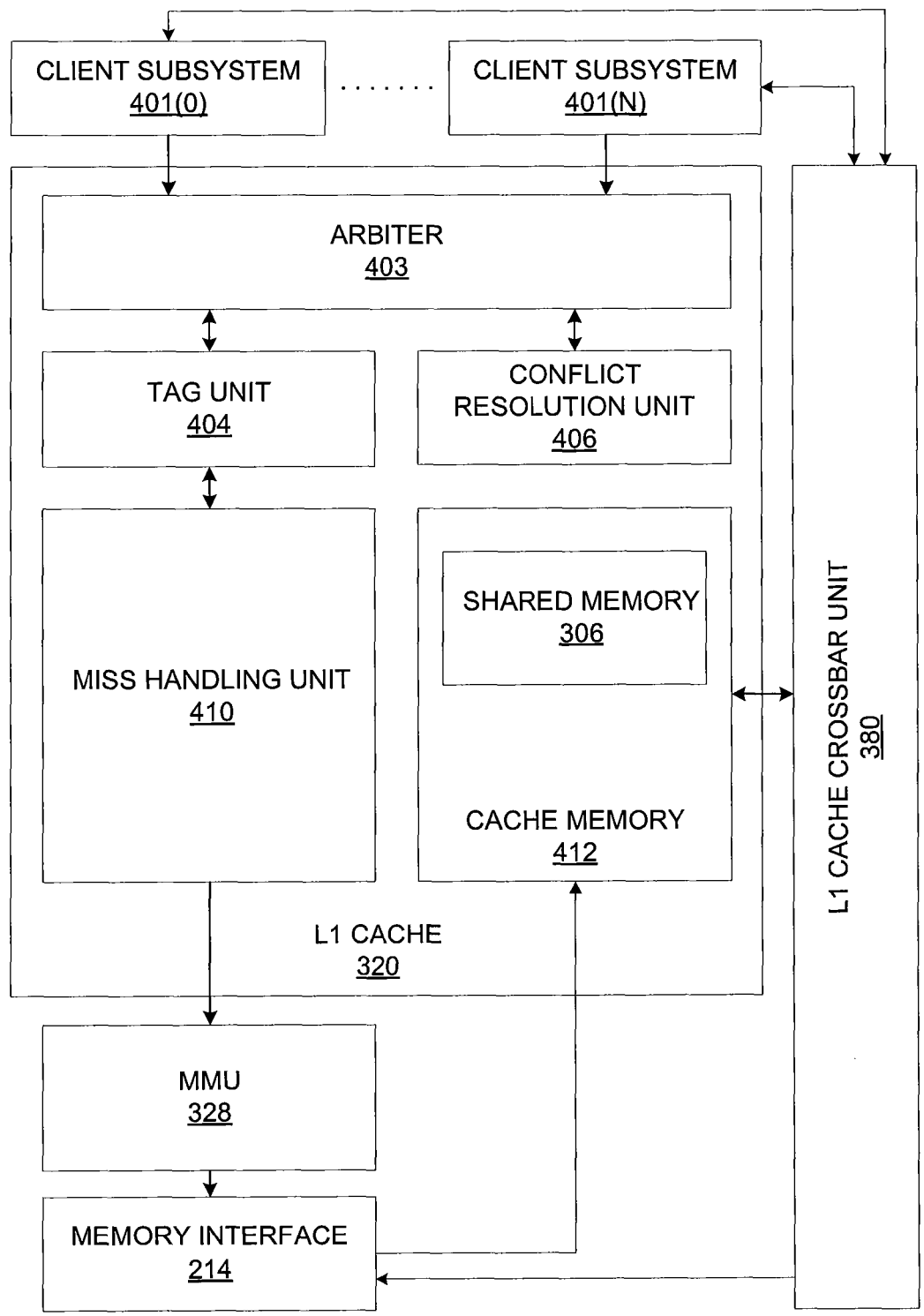
FIG. 4 is a detailed diagram of an L1 cache coupled to an L1 cache crossbar unit, according to one embodiment of the present invention.

FIG. 4 is a detailed diagram of an L1 cache 320 coupled to an L1 cache crossbar unit 380?, according to one embodiment of the present invention. As shown, the L1 cache 320 is coupled to client subsystems 401, the MMU 328, the memory interface 214 and the L1 cache crossbar 380. As also shown, the L1 cache 320 includes an arbiter 403, a tag stage unit 404, a conflict resolution unit 406, a miss handling unit 410 and a cache memory 412.

Different client subsystems 401 transmit read and write data requests to the L1 cache 320. A client subsystem 401 can be any unit within the SPM 310 such as a load-store unit LSU 303 or an execution unit 302. Each data request is associated with a specific type indicating whether the data request is for local data, global data or shared data. Further, each data request is associated with an address. The type of the data request and the address associated with the data request determine where data associated with the data request is retrieved or written.

Data associated with a shared read data request is retrieved from the shared memory portion 306 of the cache memory 412 and is transmitted to the requesting client subsystem 401 via the L1 cache crossbar unit 380. Data associated with a local read data request is retrieved from the cache memory 412 and can be transmitted to the requesting client subsystem 401 over a channel (not shown) other than the L1 cache crossbar unit 380. Data associated with a global write data request is retrieved from the cache memory 412 and is transmitted to the requesting client subsystem 401 via the L1 cache crossbar unit 380.

Data associated with a shared write data request is transmitted by a client subsystem 401 via the L1 cache crossbar unit 380 and is written to a shared memory 306 of the cache memory 412. Such data remains in the shared memory 306 and is not transmitted to the partition units 215 via the memory interface 214 for storage in the L2 cache 350 or a frame buffer. Data associated with a local write data request can be transmitted by a client subsystem 401 over a channel (not shown) other than the L1 cache crossbar unit 380 and is written to the cache memory 412. Such data may be transmitted to the partition units 215 via the memory interface 214 for storage in the L2 cache 350 or a frame buffer. Data associated with a global write data request is transmitted by a client subsystem 401 via the L1 cache crossbar unit 380 and is transmitted directly to the memory interface 214 for storage in the L2 cache 350 or a frame buffer.

The cache memory 412 is organized into banks, where each bank includes multiple memory locations identified by indices. An address associated with a data request has two components, an index and a bank. The combination of the index and the bank indicates the specific location within the cache memory 412 where data is to be retrieved or written. In a given clock cycle, data can be read from or written to only one memory location within each bank. In one embodiment, the cache memory 412 is organized into thirty-two banks, and each thread in a CTA having thirty-two threads can read from or write to one memory location within a different bank.

For a read data request, the tag unit 404 determines whether the data associated with the read data request is available within the cache memory 412 based on the address associated with the read data request. If the data associated with the read data request is not available within the cache memory 412, then the tag unit 404 transmits the read data request to the miss handling unit 410. The miss handling unit 410, in response to the read data request, transmits a fill data request to the memory interface 214 via the MMU 328. When the fill data request is processed, the data associated with the read data request is transmitted to the cache memory 412 from the memory interface 214 at a pre-determined clock cycle.

In operation, the arbiter 403 receives read and write data requests from the client subsystems 401. The arbiter 403 arbitrates between the read and write data requests to determine the order in which the data requests are processed and to schedule the L1 cache crossbar unit 380 to transmit data associated with the data requests. The arbitration process implemented by the arbiter 403 is based on different factors. One factor is that, at a given clock cycle, only one location within a bank can be accessed. Another factor is that, at a given clock cycle, the L1 cache crossbar unit 380 can only transmit data unidirectionally as either store data or read data.

When arbitrating between a set of data requests, the arbiter 403 first determines a subset of data requests that can be processed together based on the instruction types and the addresses associated with the subset of data. Data requests associated with instruction types that use the L1 cache crossbar unit 380 for transmitting data can only be processed together if the data requests are either all write data requests or all read data requests. Therefore, data requests having the shared instruction type or the global instruction type can be processed together only if either all write data requests or all read data requests. In one embodiment, data requests having a local instruction type can be processed with any combination of data requests since those data requests do not use the L1 cache crossbar unit 380 for transmitting data.

Once the subset of data requests that can be processed together is determined, the arbiter 403 determines whether any conflicts exist between the subset of data requests. A conflict exists between two data requests when each data request is associated with an address that identifies the same bank within the cache memory 412 or, in the case of data requests having a global instruction types, the same bank within the frame buffer memory. The arbiter 403 transmits the data requests having conflicts to the conflict resolution unit 406 for resolving conflicts between the data requests.

When read data requests are associated with addresses that identify different memory locations within a bank, the conflict resolution unit 406 resolves the conflict by selecting one read data request for processing and indicating to the arbiter 403 that the other read data requests should be deferred for processing at a later clock cycle. This is a consequence of the limitation imposed by the cache memory 412 and a frame buffer memory or L2 cache memory that only one memory location within a bank can be read from in a given clock cycle.

When read data requests are associated with addresses that identify the same memory location within a bank, the conflict resolution unit 406 resolves the conflict by determining that the read data requests can be processed together. The data stored in the memory location identified by the address is broadcast to the client subsystems 401 associated with the read data requests in the same clock cycle.

When write data requests are associated with addresses that identify different memory locations within a bank, the conflict resolution unit 406 resolves the conflict by selecting one write data request for processing. The conflicts resolution 406 then indicates to the arbiter 403 that the other write data requests should be deferred for processing at a later clock cycle. This is a consequence of the limitation imposed by the cache memory 412 and a frame buffer memory or L2 cache memory that only one memory location within a bank can be written to in a given clock cycle. When write data requests are associated with addresses that identify the same memory location within a bank, the conflict resolution unit 406 resolves the conflict by performing a write collapse operation or a write merge operation.

In a write collapse operation, the conflict resolution unit 406 selects one of the write data requests that are associated with addresses that identify the same memory location for writing the data associated with the write data request to the memory location. The remaining write data requests are discarded. The selection of the write data request can be based on any technically feasible criteria. In one embodiment, the selection is based on the specific client subsystem 401 that transmitted the selected write data request having a higher priority than the client subsystem 401 that is not selected. In a write merge operation, the conflict resolution unit 406 determines that the write data requests that are associated with addresses that identify the same memory location can be processed together. The data associated with different write data requests is merged together such that the data associated with each such write data request fills a pre-determined portion of the memory location. When merged, the data associated with the write data requests fills the entire memory location.

Once the conflicts are resolved, the arbiter 403 transmits the selected data requests included in the subset of data requests for processing. In addition, the arbiter 403 schedules the L1 cache crossbar unit 380 for transmitting data associated with the data requests that require the L1 cache crossbar unit 380. The scheduling and the arbitration performed by the arbiter 403 allows for fully pipelined operation of the L1 cache 320 with no turn around delay between normal read and write requests.

In one embodiment the arbiter 403 comprises the conflict resolution unit 406.

Table 1 shows different requests that are received by the arbiter 403 for processing and the cycles relative to arbitration that are need to completely process the requests.

TABLE 1

Example of Data Requests Scheduled Relative to Arbitration

| Request Type | Cycle relative to arbitration | | | | | |
|---|---|---|---|---|---|---|
| | 0 | 1 | 2 | 3 | 4 | 5 |
| Write Request | Receive wr req | (process) | Fwd/process wr addr, data | Fwd/process wr addr, data | Xbar wr data | Write target |
| Read Request | Receive rd req | (process) | Apply rd addr | Read target | Xbar read data | rd result available |
| RMW Request | Receive rmw req | (process) | Apply rd addr | Read target | Fwd rd data, Xbar wr data | Merge data, Write target |

The data requests received by the arbiter 403 may be processed in a fully pipelined manner. This is shown below for a series of write data requests in Table 2. Similarly, a series of read data requests is shown in Table 3. In addition, Table 4 shows a combination of read and write data requests pipelined consecutively demonstrating no read to write or write to read turn around delay.

Importantly, the timings shown in Tables 1-4 are only example timings used for illustrating the concepts described herein.

TABLE 2

| Request Type | Cycle | | | | | | | |
|---|---|---|---|---|---|---|---|---|
| | 0 | 1 | 2 | 3 | 4 | 5 | 6 | 7 |
| Wr Req A | Receive wr req | (process) | Fwd/process wr addr, data | Fwd/process wr addr, data | Xbar wr data | Write target | | |
| Wr Req B | | Receive wr req | (process) | Fwd/process wr addr, data | Fwd/process wr addr, data | Xbar wr data | Write target | |
| Wr Req C | | | Receive wr req | (process) | Fwd/process wr addr, data | Fwd/process wr addr, data | Xbar wr data | Write target |

TABLE 3

Pipelined Read Requests

| Request Type | Cycle 0 | 1 | 2 | 3 | 4 | 5 | 6 | 7 |
|---|---|---|---|---|---|---|---|---|
| Rd Req A | Receive rd req | (process) | Apply rd addr | Read target | Xbar read data | rd result available | | |
| Rd Req B | | Receive rd req | (process) | Apply rd addr | Read target | Xbar read data | rd result available | |
| Rd Req C | | | Receive rd req | (process) | Apply rd addr | Read target | Xbar read data | rd result available |

TABLE 4

Pipelined Mixed Requests

| Request Type | Cycle 0 | 1 | 2 | 3 | 4 | 5 | 6 | 7 |
|---|---|---|---|---|---|---|---|---|
| Rd Req A | Receive rd req | (process) | Apply rd addr | Read target | Xbar read data | rd result available | | |
| Wr Req B | | Receive wr req | (process) | Fwd/process wr addr, data | Fwd/process wr addr, data | Xbar wr data | Write target | |
| Rd Req C | | | Receive rd req | (process) | Apply rd addr | Read target | Xbar read data | rd result available |

In one embodiment, the write data requests take longer to be processed than read data requests. In such an embodiment, pipeline hazards may occur. One specific hazard is when the L1 cache 320 performs a read-modify-write (RMW) cycle. Given that a RMW has been initiated and is in progress to one or more addresses, a subsequent RMW involving any of those addresses is subject to cause data corruption if the subsequent RMW performs the read portion before the prior RMW commits its results. This is show below in Table 5, assuming the read for RWM Req B requests at least one of the addresses written by RMW Req A. To prevent the pipeline hazard, the L1 cache 320 supports a defer/replay protocol, where a RMW request is deferred if a hazard is detected.

TABLE 5

Series of RMW requests, showing potential hazard

| Request Type | Cycle 0 | 1 | 2 | 3 | 4 | 5 | 6 | 7 |
|---|---|---|---|---|---|---|---|---|
| RMW Req A | Receive rmw req | (process) | Apply rd addr | Read target | Fwd rd data, Xbar wr data | Merge data, Write target | | |
| RMW Req B | | Receive rmw req | (process) | Apply rd addr | Read target | Fwd rd data, Xbar wr data | Merge data, Write target | |
| RMW Req C | | | Receive rmw req | (process) | Apply rd addr | Read target | Fwd rd data, Xbar wr data | Merge data, Write target |

Figure 5:
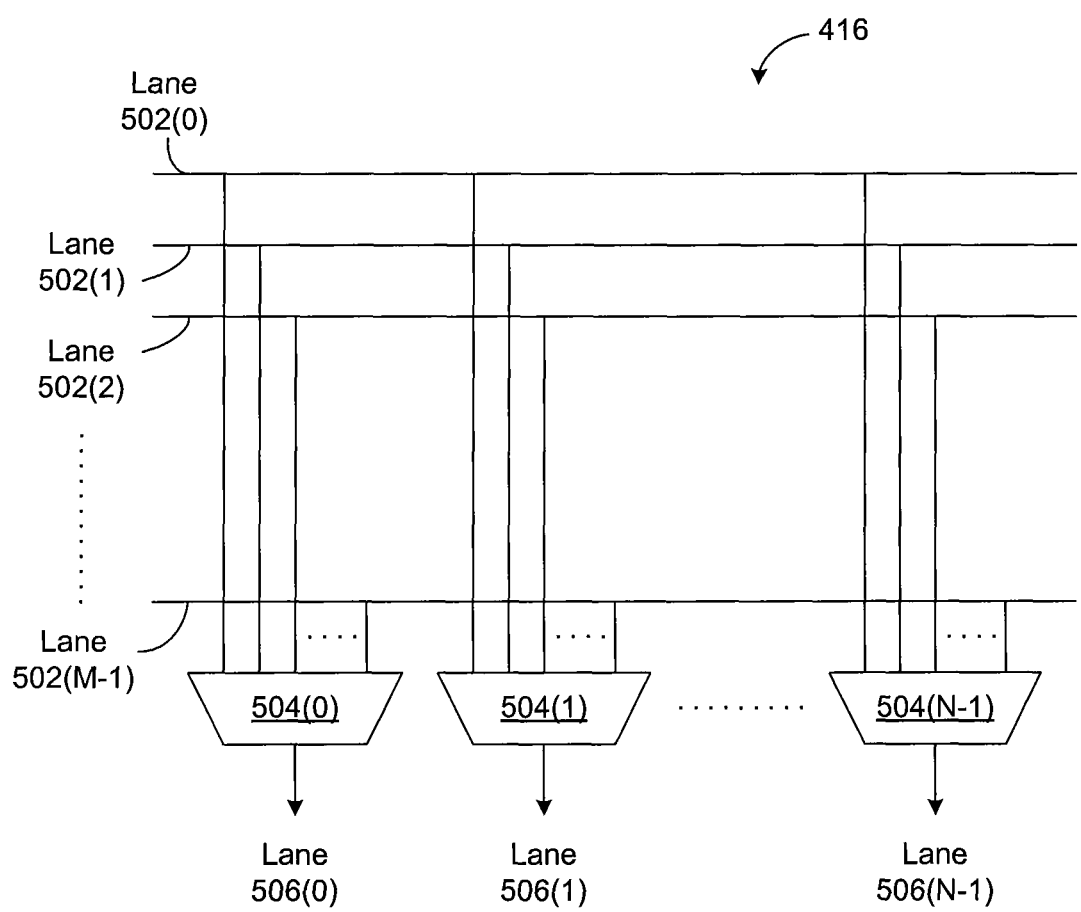
FIG. 5 is a detailed diagram of the L1 cache crossbar unit of FIG. 4, according to one embodiment of the present invention.

FIG. 5 is a detailed diagram of the L1 cache crossbar unit 380 of FIG. 4, according to one embodiment of the present invention. As shown, the L1 cache crossbar unit 380 includes lanes 502, selection units 504 and lanes 506. Each lane 502 is capable of transmitting data and is an input to a selection unit 504. Each lane 506 is capable of transmitting data received as an output of the selection unit 504. In one embodiment, the number "M" corresponds to the number of banks included in the cache memory 412 and the number "N" corresponds to the number of client subsystems 401(N).

In operation, when the L1 cache crossbar unit 380 is scheduled to transmit data associated with read data requests, each lane 502 is configured to transmit data retrieved from a different bank within the cache memory 412. Each selector 504 is associated with a specific client subsystem 401 and selects the input from a lane 502 that transmits the data associated with the read data request transmitted by the specific client subsystem 401. The data from the selected lane 502 is output to the lane 506 for transmission to the specific client subsystem 401.

When the L1 cache crossbar unit 380 is scheduled to transmit data associated with write data requests, each lane 502 is configured to transmit data transmitted by a different client subsystem 401 that transmitted a write data request being processed. Each selector 504 is associated with a specific bank included in the cache memory 412 and selects the input from a lane 502 that transmits the data directed to the associated bank. The data from the selected lane 502 is output to the lane 506 for transmission to the corresponding bank for storage.

As previously described, the SPM 310 operates in SIMT style, where a thread group (or warp) executes on a group of execution units 302, and at a given clock cycle, each active thread in the thread group executes the same instruction with different data. When each thread of a thread group executing on a different execution unit 302 needs to read data or write data from/to the cache memory 412, a corresponding read or write data request is received by the arbiter 403 from the execution unit 302. The addresses associated with a set of read data requests transmitted by the thread group may not be aligned with the physical layout of the banks in the cache memory 412. Advantageously, the architecture of the L1 cache crossbar unit 380 described above allows for the data being retrieved from the cache memory 412 or transmitted to the cache memory 412 to be properly aligned with the physical layout of the cache memory 412.

Figure 6:
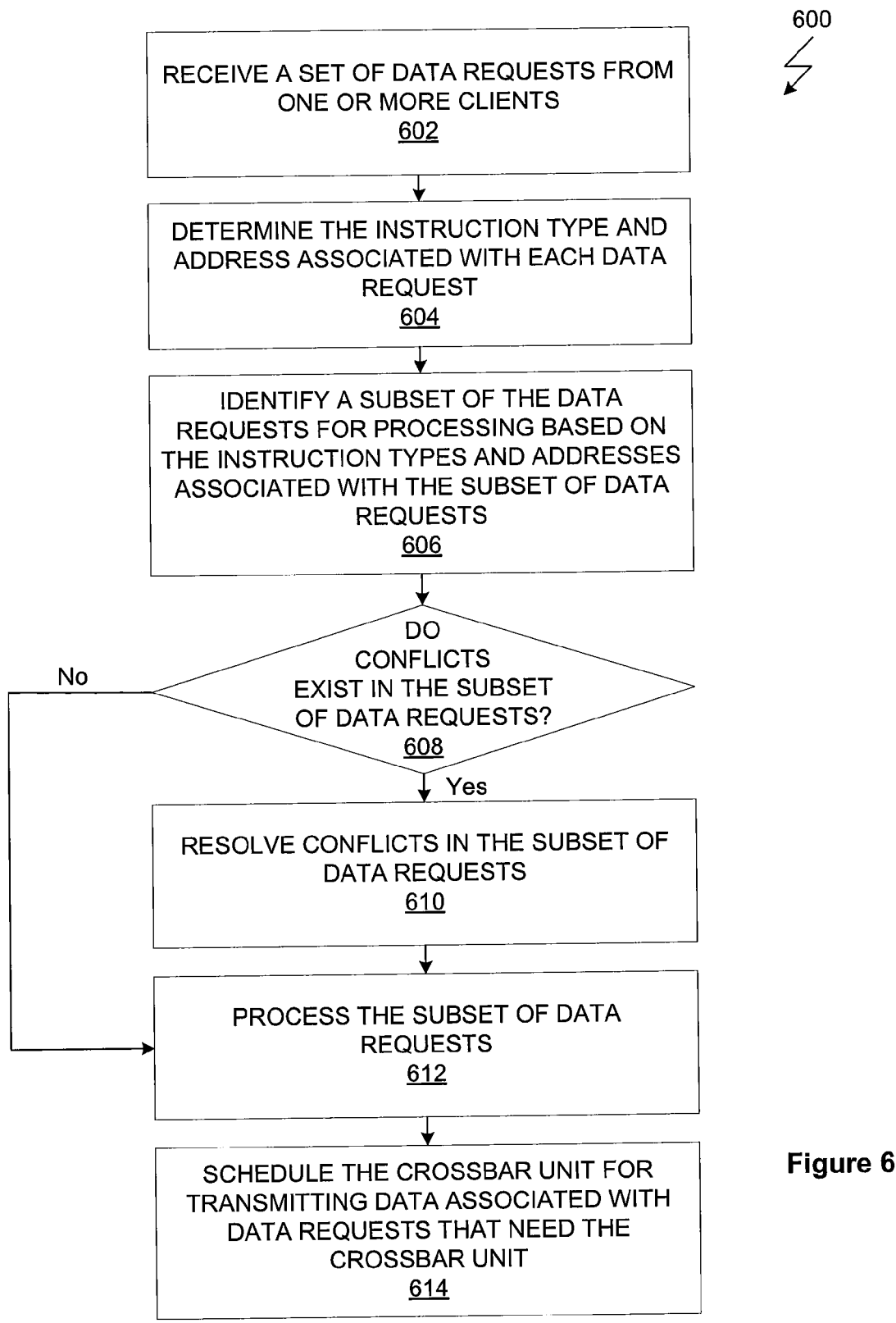
FIG. 6 is a flow diagram of method steps for scheduling read and write operations on the L1 cache crossbar unit, according to one embodiment of the present invention.

FIG. 6 is a flow diagram of method steps for scheduling read and write operations on the L1 cache crossbar unit, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602, where the arbiter 403 receives a set of data requests from the client subsystems 401. As previously described herein, a data request may be a read data request, a write data request or a read-modify-write data request. At step 604, the arbiter 403 determines the instruction type and the address associated with each data request in the set of data requests. The address associated with a data request identifies the specific memory location within a bank where the data associated with the data requests should be read or written. The instruction type associated with a data request determines how the data request is processed.

At step 606, the arbiter 403 identifies a subset of data requests that can be processed together within a given cycle based on the instruction types and the addresses associated with the data requests. As previously described herein, data requests associated with instruction types that use the L1 cache crossbar unit 380 for transmitting data can only be processed together if the data requests are either all write data requests or all read data requests. Therefore, data requests having the shared instruction type or the global instruction type can be processed together only if either all write data requests or all read data requests. In one embodiment, data requests having a local instruction type can be processed with any combination of data requests since those data requests do not use the L1 cache crossbar unit 380 for transmitting data.

At step 608, the arbiter 403 determines whether any conflicts exist between the data requests included in the subset of data requests. A conflict exists between two data requests when each data request is associated with an address that identifies the same bank within the cache memory 412 or, in the case of data requests having a global instruction types, the same bank within the frame buffer memory.

If, at step 608, conflicts exist between any data requests in the subset of data requests, then the method 600 proceeds to step 610, where the conflict resolution unit 406 resolves the conflicts using the techniques described in conjunction with FIG. 4.

At step 612, the L1 cache 320 processes each data request included in the subset of data requests. At step 614, the arbiter 403 schedules the L1 cache crossbar unit 380 for the transmission of data associated with data requests in the subset of data requests that require the L1 cache crossbar unit 380.

Referring back to step 608, if no conflicts exist between the data request in the subset of data requests, then the method 600 proceeds directly to step 612 described herein.

Although the method steps are described in conjunction with the systems of FIGS. 1, 2, 3A, 3B, and 3C, persons skilled in the art will understand that any system configured to perform the method steps, in any order, is within the scope of the inventions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for processing a plurality of data requests received from a client entity within a computing device, the method comprising:

determining an instruction type and an address associated with each data request included in the plurality of data requests, wherein the instruction type comprises a local, shared, or global instruction type, and the plurality of data requests are directed towards a memory unit that includes a plurality of memory banks;

identifying a subset of the plurality of data requests to process together, the subset of data requests comprising at least two data requests for different memory banks of the memory unit, each of the at least two data requests comprising either a shared instruction type or global instruction type;

processing, by a single arbiter, the subset of data requests within a same single clock cycle of a clock to which arbiter operations are synchronized; and scheduling a cache crossbar unit either to transmit data associated with at least one data request included in the subset of data requests to the memory unit at a second clock cycle or to transmit data associated with the at least one data request retrieved from the memory unit at the second clock cycle.

2. The method of claim 1, wherein, in a given clock cycle, the cache crossbar unit is configured to transmit data to each memory bank included in the memory unit or from each memory bank included in the memory unit.

3. The method of claim 2, wherein data associated with data requests associated with a global instruction type or a shared instruction type is transmitted to/from the memory unit via the cache crossbar unit, and data associated with data requests associated with a local instruction type is not transmitted to/from the memory unit via the cache crossbar unit.

4. The method of claim 3, wherein data requests in the subset of data requests that are associated with a global instruction type or a shared instruction type is a read data request.

5. The method of claim 3, wherein data requests in the subset of data requests that are associated with a global instruction type or a shared instruction type are write data requests.

6. The method of claim 3, wherein:
the subset of data requests further comprises at least first and second data requests for a same first memory bank of the memory unit; and
the step of identifying the subset of data requests further comprises determining that a conflict exists between the first data request and the second data request in the subset of data requests.

7. The method of claim 6, wherein a conflict exists between the first data request and the second data request when the addresses associated with the first request and the second read request specify different memory locations within the first memory bank of the memory unit, and the step of identifying the subset of data requests further comprises resolving the conflict between the first data request and the second data request by including the first data request in the subset of data requests and deferring the second data request for scheduling at a third clock cycle.

8. The method of claim 6, wherein a conflict exists between the first data request and the second data request when the first data request and the second data request are write data requests and the addresses associated with the first request and the second read request specify the same memory location within the first memory bank of the memory unit.

9. The method of claim 8, wherein the step of identifying the subset of data requests further comprises resolving the conflict between the first data request and the second data request by including the first data request in the subset of data requests and discarding the second data request.

10. The method of claim 8, wherein the step of identifying the subset of data requests further comprises resolving the conflict between the first data request and the second data request by performing a write merge operation.

11. The method of claim 1, wherein the single arbiter receives and processes both read data requests and write data requests.

12. The method of claim 11, wherein the subset of data requests to process together comprises all read data requests or all write data requests.

13. The method of claim 1, wherein only one memory location in a memory bank of the memory unit can be accessed in a given clock cycle.

14. The method of claim 1, wherein:
a data request associated with a local instruction type comprises a data request for local data in the memory unit that is not accessed via the cache crossbar unit;
a data request associated with a shared instruction type comprises a data request for shared data in the memory unit that is accessed via the cache crossbar unit; and
a data request associated with a global instruction type comprises a data request for global data in the memory unit that is accessed via the cache crossbar unit.

15. A computer system, the computer system comprising:
one or more client subsystems;
a memory unit;
a cache crossbar unit; and
a single arbiter configured to:
determine an instruction type and an address associated with each data request included in the plurality of data requests;
determine an instruction type and an address associated with each data request included in the plurality of data requests, wherein the instruction type comprises a local, shared, or global instruction type, and the plurality of data requests are directed towards a memory unit that includes a plurality of memory banks;
identify a subset of the plurality of data requests to process together based on each data request in the subset of data requests comprising either a data request associated with a shared instruction type or a data request associated with a global instruction type, the subset of data requests comprising at least two data requests;
identify a subset of the plurality of data requests to process together, the subset of data requests comprising at least two data requests for different memory banks of the memory unit, each of the at least two data requests comprising either a shared instruction type or global instruction type;
process the subset of data requests within a same single clock cycle of a clock to which arbiter operations are synchronized; and
schedule the cache crossbar unit either to transmit data associated with at least one data request included in the subset of data requests to the memory unit at a second clock cycle or to transmit data associated with the at least one data request retrieved from the memory unit at the second clock cycle.

16. The computer system of claim 15, wherein, in a given clock cycle, the cache crossbar unit is configured to transmit data to each memory bank included in the memory unit or from each memory bank included in the memory unit.

17. The computer system of claim 16, wherein data associated with data requests associated with a global instruction type or a shared instruction type is transmitted to/from the memory unit via the cache crossbar unit, and data associated with data requests associated with a local instruction type is not transmitted to/from the memory unit via the cache crossbar unit.

18. The computer system of claim 17, wherein data requests in the subset of data requests that are associated with a global instruction type or a shared instruction type is a read data request.

19. The computer system of claim 17, wherein data requests in the subset of data requests that are associated with a global instruction type or a shared instruction type are write data requests.

20. The computer system of claim 17, wherein:
the subset of data requests further comprises at least first and second data requests for a same first memory bank of the memory unit; and
the arbiter is further configured to determine that a conflict exists between the first data request and the second data request in the subset of data requests.

21. The computer system of claim 20, wherein a conflict exists between the first data request and the second data request when the addresses associated with the first request and the second read request specify different memory locations within the first memory bank of the memory unit, and the arbiter is further configured to resolve the conflict between the first data request and the second data request by including the first data request in the subset of data requests and deferring the second data request for scheduling at a third clock cycle.

22. The computer system of claim 20, wherein a conflict exists between the first data request and the second data request when the first data request and the second data request are write data requests and the addresses associated with the first request and the second read request specify the same memory location within the first memory bank of the memory unit.

23. The computer system of claim 22, wherein the arbiter is further configured to resolve the conflict between the first data request and the second data request by including the first data request in the subset of data requests and discarding the second data request.

24. The computer system of claim 22, wherein the arbiter is further configured to resolve the conflict between the first data request and the second data request by performing a write merge operation.

25. The computer system of claim 15, wherein the single arbiter receives and processes both read data requests and write data requests.

26. The computer system of claim 25, wherein the subset of data requests to process together comprises all read data requests or all write data requests.

27. The computer system of claim 15, wherein only one memory location in a memory bank of the memory unit can be accessed in a given clock cycle.

28. The computer system of claim 15, wherein:
- a data request associated with a local instruction type comprises a data request for local data in the memory unit that is not accessed via the cache crossbar unit;
- a data request associated with a shared instruction type comprises a data request for shared data in the memory unit that is accessed via the cache crossbar unit; and
- a data request associated with a global instruction type comprises a data request for global data in the memory unit that is accessed via the cache crossbar unit.

* * * * *